(No Model.) 3 Sheets—Sheet 1.

G. A. JOHNSSON.
ICE VELOCIPEDE.

No. 584,055. Patented June 8, 1897.

Witnesses.
Lauritz N. Möller
Charles A. Harris

Inventor:
Gustaf Adolf Johnsson.
by Ivan Gudien
his atty (No Model.) 3 Sheets—Sheet 3.

G. A. JOHNSSON.
ICE VELOCIPEDE.

No. 584,055. Patented June 8, 1897.

Witnesses.
Lauritz N. Möller,
Charles A. Harris.

Inventor.
Gustaf Adolf Johnsson
by Alban Andrén,
his atty.

UNITED STATES PATENT OFFICE.

GUSTAF ADOLF JOHNSSON, OF EVERETT, MASSACHUSETTS, ASSIGNOR OF ONE-HALF TO GUSTAF JOHNSON, OF SAME PLACE.

ICE-VELOCIPEDE.

SPECIFICATION forming part of Letters Patent No. 584,055, dated June 8, 1897.

Application filed March 5, 1897. Serial No. 626,026. (No model.)

*To all whom it may concern:*

Be it known that I, GUSTAF ADOLF JOHNSSON, a citizen of Sweden and Norway, and a resident of Everett, in the county of Middlesex and State of Massachusetts, have invented new and useful Improvements in Ice-Velocipedes, of which the following, taken in connection with the accompanying drawings, is a specification.

This invention relates to improvements in velocipedes adapted to be propelled on ice or snow, and it is carried out as follows, reference being had to the accompanying drawings, wherein—

Figure 1:
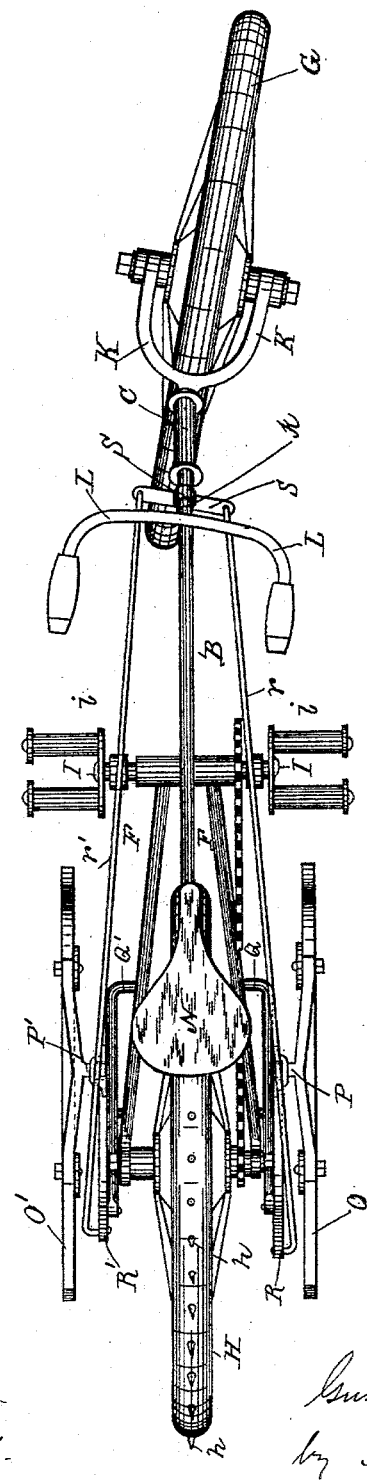
Figure 2:
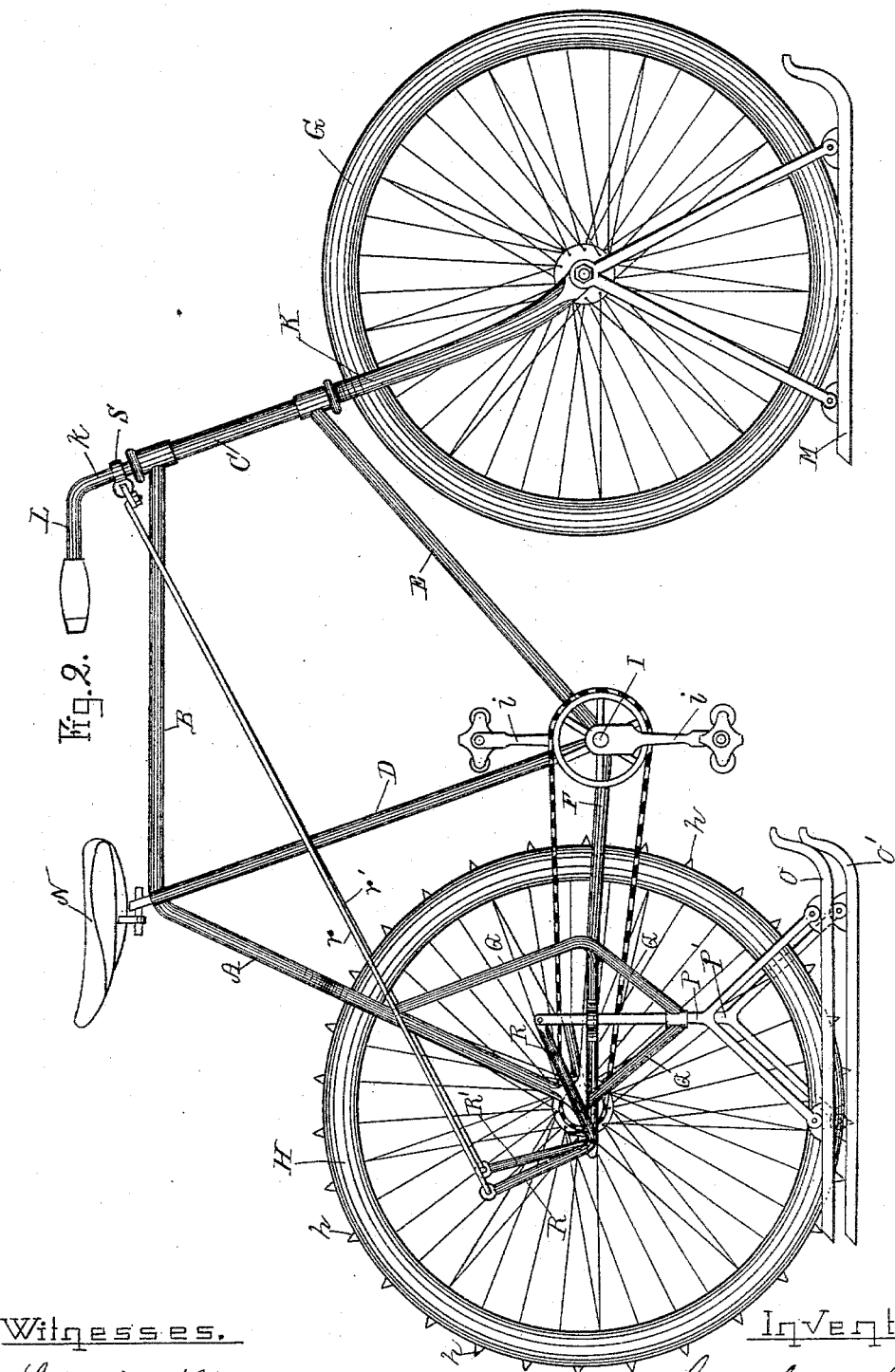
Figure 3:
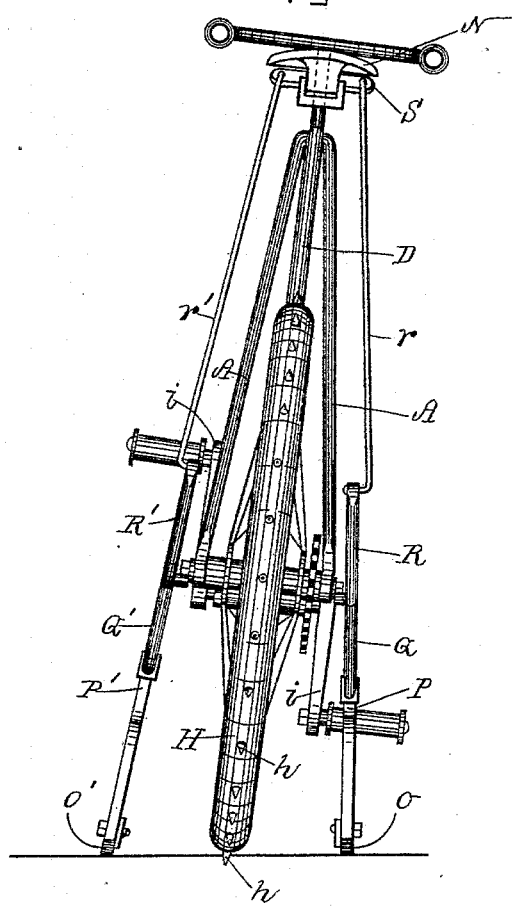

Figure 1 represents a top plan view of the invention. Fig. 2 represents a side elevation; and Fig. 3 represents a rear view of the improved velocipede, showing it tipped toward one side in turning a curve.

Similar letters refer to similar parts wherever they occur on the different parts of the drawings.

A, B, C, D, E, and F represent the diamond frame of an ordinary bicycle, on which G is the forward wheel and H the rear driving-wheel, as usual. $h\ h$ are radial prongs or projections on the periphery of the driving-wheel H, as is common on ice or snow velocipedes. The rear wheel is propelled by the usual cranks $i\ i$, secured to the crank-axle I, and chain or other driving mechanism from the crank-shaft to the rear wheel in any well-known manner.

K is the forward fork.

$k$ is the fork-spindle, journaled in the socket C of the bicycle-frame, and L is the handle-bar, secured to the spindle $k$, as usual.

To the forward fork K is secured in a suitable manner the forward shoe or runner M, on which the forward wheel G is preferably supported, as shown in Fig. 2.

N is the saddle, as usual.

On opposite sides of the rear driving-wheel H are arranged the shoes or runners O and O', secured, respectively, to rods P P', which are vertically adjustable in guides in the respective brackets Q Q', attached in a suitable manner to the velocipede-frame portions A F, as shown in the drawings.

The upper end of the rod P is pivotally connected to a knee-lever R, which is pivoted at $q$ to the rear of the bracket Q, as shown. In a like manner the upper end of the rod P' is pivotally connected to a corresponding knee-lever R', pivoted at $q$ to the rear end of the bracket Q'.

To the fork-spindle I attach a cross-bar S, the ends of which are connected to the knee-levers R R' by means of the respective links or rods $r\ r'$, as shown in the drawings. It will thus be seen that when the steering-shoe or runner M is turned more or less toward the right in going around a curve in such direction the cross-bar S, connected to the fork-spindle $k$ and the intermediate connecting mechanism from such cross-bar to the vertically-adjustable runners O O', causes one of said runners—namely, in this instance, the one marked O—to be raised and the opposite one correspondingly depressed, thus causing the velocipede to be held slightly inclined toward the right, as shown in Fig. 3, while guiding the velocipede toward the right in a curved path, thus automatically and properly inclining the wheel and rider while going on a curve.

The sharper the curve is the more the velocipede is caused to be inclined or to lean over, and vice versa. While turning the velocipede toward the left the runner O' is raised and the runner O correspondingly lowered in a manner and for the purpose as above described. By this arrangement the velocipede is automatically held in the proper inclined position toward the concavity of the curve in which it is guided, thus preventing its tipping over in the opposite direction of such inclination, which would be liable to occur if the velocipede was held upright in going swiftly around curves.

The device is so constructed that it may easily be applied to a velocipede of any ordinary or well-known pattern when desired to be used on ice or snow, and may also be easily detached from such velocipede when desired to be used for road purposes.

Having thus fully described the nature, construction, and operation of my invention, I wish to secure by Letters Patent and claim—

In combination with a velocipede, a shoe or runner attached to the forward steering-fork, a pronged rear driving-wheel, a pair of vertically-adjustable shoes or runners located at opposite sides of such driving-wheel and connecting mechanism from the steering-spindle or handle-bar to such shoes or runners for the purpose of automatically inclining the velocipede when traveling in a curved path substantially as herein set forth.

In testimony whereof I have signed my name to this specification, in the presence of two subscribing witnesses, on this 15th day of February, A. D. 1897.

GUSTAF ADOLF JOHNSSON.

Witnesses:
ALBAN ANDRÉN,
LAURITZ N. MOLLER.